(12) United States Patent
Wijaya et al.

(10) Patent No.: US 10,639,961 B2
(45) Date of Patent: May 5, 2020

(54) PARTIAL AIR INLET CONTROL STRATEGY FOR AIR CONDITIONING SYSTEM

(75) Inventors: Halim Wijaya, Canton, MI (US);
Ranganathan Madhavan, Canton, MI (US); Curtis M. Jones, Wixom, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1637 days.

(21) Appl. No.: 12/831,380

(22) Filed: Jul. 7, 2010

(65) Prior Publication Data

US 2012/0009859 A1    Jan. 12, 2012

(51) Int. Cl.
*B60H 1/00* (2006.01)

(52) U.S. Cl.
CPC ..... *B60H 1/00849* (2013.01); *B60H 1/00764* (2013.01); *B60H 1/00785* (2013.01)

(58) Field of Classification Search
CPC ............ B60H 1/00764; B60H 1/00849; B60H 1/00785; B60H 1/008; B60H 1/3207; B60H 2001/3245; B60H 2001/327
(Continued)

(56) References Cited

U.S. PATENT DOCUMENTS 5,259,813 A * 11/1993 Abthoff et al. ................ 454/75
5,320,577 A *  6/1994 Tooru et al. .................... 454/75
(Continued)

OTHER PUBLICATIONS

Sauer et al., "A Climate Control Sensor for Optimizing the Circulating-Air Mode by Controlling the CO2 Level Inside the Passenger Compartment", 7 pages, 2003-2004.

*Primary Examiner* — Steven B McAllister
*Assistant Examiner* — Ko-Wei Lin (57) ABSTRACT

A system and method of selecting air intake between 100% fresh air mode and 100% recirculated air mode for optimum heating/cooling performance, fuel economy and/or high voltage (HV) battery power consumption is disclosed. The system and method includes a partial recirculation control strategy in which the air inlet door is moved progressively to any position by taking into account cooling/heating loads and cabin fogging probability. As cooling/heating loads increase the air inlet door moves toward 100% recirculation mode. As fogging probability increases the air inlet door moves toward 100% fresh air mode. By selectively choosing a position between 100% recirculation and 100% fresh air, fuel economy and/or HV battery power consumption is optimized without compromising passenger comfort or causing fogging on interior glass surfaces. In cooling applications the compressor load is minimized and air conditioning performance is improved due to the reduced evaporator cooling load. The direct result of this improvement is increased fuel economy in the case of the internal combustion vehicle, reduced engine on time in the case of the hybrid electric vehicle (due to reduced HV battery power consumption), and reduced HV battery power consumption in the case of the hybrid electric vehicle (HEV) and the electric vehicle (EV). In heating applications, as the heating load is reduced the fuel economy of the internal combustion (IC) engine will be improved, the engine on time is reduced in the case of the HEV, and HV battery power consumption is reduced in the case of the EV.

16 Claims, 5 Drawing Sheets

(58) Field of Classification Search
USPC .................................................. 454/69–165
See application file for complete search history.

(56) References Cited

U.S. PATENT DOCUMENTS

| | | | |
|---|---|---|---|
| 5,516,041 A * | 5/1996 | Davis et al. ................. | 236/49.3 |
| 5,725,425 A * | 3/1998 | Rump et al. .................... | 454/75 |
| 5,907,954 A | 6/1999 | Kettner | |
| 5,934,987 A * | 8/1999 | Baruschke et al. ............. | 454/75 |
| 5,971,287 A | 10/1999 | Kettner et al. | |
| 5,980,378 A * | 11/1999 | Wieszt ............................ | 454/75 |
| 6,155,061 A * | 12/2000 | Davis et al. .................. | 62/176.6 |
| 6,332,497 B1 * | 12/2001 | Niwa et al. ................... | 165/204 |
| 6,341,495 B1 | 1/2002 | Oberberger et al. | |
| 6,659,358 B2 * | 12/2003 | Kamiya et al. .............. | 236/49.3 |
| 6,668,917 B1 * | 12/2003 | Zeng ............................ | 165/202 |
| 6,874,990 B2 * | 4/2005 | Nadeau ....................... | 415/173.5 |
| 7,013,656 B2 * | 3/2006 | Yanagimachi et al. ......... | 62/126 |
| 7,172,018 B2 * | 2/2007 | Katou et al. .................. | 165/204 |
| 7,210,523 B2 * | 5/2007 | Umebayashi ...... | B60H 1/00842 |
| | | | 165/204 |
| 7,357,176 B2 | 4/2008 | Yelles | |
| 7,387,437 B2 * | 6/2008 | Brown et al. ................. | 374/141 |
| 7,392,838 B2 * | 7/2008 | Errington et al. ............ | 165/204 |
| 7,640,753 B2 * | 1/2010 | Kadle ................ | B60H 1/00285 |
| | | | 165/202 |
| 7,803,039 B2 * | 9/2010 | Inoue et al. .................... | 454/75 |
| 8,092,285 B2 * | 1/2012 | Mathur et al. .................. | 454/75 |
| 8,932,119 B2 * | 1/2015 | Suetake et al. ................. | 454/75 |
| 2002/0197949 A1 * | 12/2002 | Kampf et al. .................. | 454/75 |
| 2004/0221594 A1 * | 11/2004 | Suzuki et al. .................. | 62/236 |
| 2005/0121185 A1 * | 6/2005 | Yonekura et al. ............. | 165/202 |
| 2006/0004494 A1 * | 1/2006 | Errington ......................... | 701/1 |
| 2006/0225450 A1 * | 10/2006 | Dage et al. .................... | 62/323.1 |
| 2006/0270333 A1 * | 11/2006 | Hirai et al. ...................... | 454/75 |
| 2008/0173437 A1 * | 7/2008 | Yelles .......................... | 165/204 |
| 2008/0183334 A1 * | 7/2008 | Greiner et al. ............... | 700/276 |

\* cited by examiner

PARTIAL AIR INLET CONTROL STRATEGY FOR AIR CONDITIONING SYSTEM

TECHNICAL FIELD

The disclosed invention relates generally to a system for regulating incoming air flow in a vehicle heating/cooling system. More particularly, the disclosed invention relates to a system and method for providing an efficient selection between 100% fresh air mode and 100% recirculated air mode to optimize heating/cooling performance while increasing fuel economy in the case of the internal combustion (IC) vehicle, increasing engine off time in the case of the hybrid vehicle, and reducing high voltage (HV) battery power consumption in the case of the electric vehicle.

BACKGROUND OF THE INVENTION

Improved fuel economy for the internal combustion engine-powered vehicle has long been a goal of automobile manufacturers. With the advent of the hybrid electric vehicle (HEV) a new goal, reducing engine on time, has been created. With the electric vehicle (EV) the goal is to minimize power consumption from the high voltage (HV) battery. Challenging achievement of these goals is the need to maintain a comfortable cabin.

Cabin comfort is maintained by both vehicle heating and cooling systems. When heating and cooling systems were first introduced, incoming fresh air was relied upon for both heating and cooling. As systems developed the recirculation mode was introduced into vehicle heating and cooling technology. Accordingly, today there are two ways air can enter the heating, ventilation and air conditioning (HVAC) system of an automotive air conditioning system. One of these ways is the fresh air mode. The other is the recirculation air mode.

However, for all types of vehicles there is a trade-off between these parameters. Particularly, for the internal combustion (IC) vehicle (including the hybrid electric vehicle [HEV]), fuel economy will suffer to maximize heating/cooling performance. In the electric vehicle, battery power consumption will be increased to maximize heating/cooling performance. Today the selection of the air mode is often made without consideration for the optimization of heating/cooling performance, fuel economy and/or high voltage (HV) battery power consumption. If the management of the air entering the HVAC is not managed carefully these parameters may not be optimized. Particularly, if the fresh air mode is selected as the source of air for the HVAC system in hot weather, this air mode will add more cooling load to the compressor. On the other hand, if the fresh air mode is selected as the source of air for the HVAC system in cold weather, this air mode will slow down heater/defrost performance. Yet when the recirculation mode is selected to provide 100% of the incoming air for the HVAC, a potential result, in certain ambient conditions, is cabin fogging.

Accordingly, as is often the case, there is room for improvement in the art of controlling the selection of incoming air to achieve parameter optimization.

SUMMARY OF THE INVENTION

The disclosed invention provides a method of efficiently selecting air intake between the 100% fresh air mode and 100% recirculated air mode. The disclosed invention provides optimum heating/cooling performance, fuel economy and/or high voltage (HV) battery power consumption.

According to the disclosed invention, a partial recirculation control strategy is provided. The system of the disclosed invention manages the air inlet door to move progressively to any position by taking into account cooling/heating loads and cabin fogging probability. As cooling/heating loads increase the air inlet door moves toward 100% recirculation mode. As fogging probability increases the air inlet door moves toward 100% fresh air mode.

By selectively choosing a position between 100% recirculation and 100% fresh air, fuel economy and/or HV battery power consumption is optimized without compromising passenger comfort or causing fogging on interior glass surfaces. Particularly, in cooling applications the compressor load is minimized and air conditioning performance is improved due to the reduced evaporator cooling load. The direct result of this improvement is increased fuel economy in the case of the internal combustion vehicle, reduced engine on time in the case of the hybrid electric vehicle (due to reduced HV battery power consumption), and reduced HV battery power consumption in the case of the hybrid electric vehicle (HEV) and the electric vehicle (EV). In heating applications, as the heating load is reduced the fuel economy of the internal combustion (IC) engine will be improved, the engine on time is reduced in the case of the HEV, and HV battery power consumption is reduced in the case of the EV.

In addition to the benefit in obtaining improved fuel economy and HV battery power consumption, the heater/defrost and AC performance can be improved in all of these vehicles.

In certain ambient conditions where fogging risk is very high, cabin humidity needs to be managed when the partial recirculation control strategy of the disclosed invention is active. The disclosed control strategy uses a sensor to monitor the cabin humidity. When cabin humidity increases and fogging probabilities reach a certain limit, the controller moves the air inlet door progressively toward the fresh air mode.

Any drawbacks of the disclosed invention may be readily overcome. For example, due to the nature of the air entering the vehicle into the cowl and to the inlet door, it may be the case that a partial recirculating door opening may cause issues such as increased noise, vibration and harshness (NVH) or the spillover of outside air from the HVAC unit into the vehicle cabin. However, the air flow control strategy of the disclosed invention includes a strategy to prevent these issues based upon HVAC blower and vehicle speeds.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawing and described below by way of examples of the invention wherein.

DETAILED DESCRIPTION OF THE PREFERRED EMBODIMENT

Figure 1:
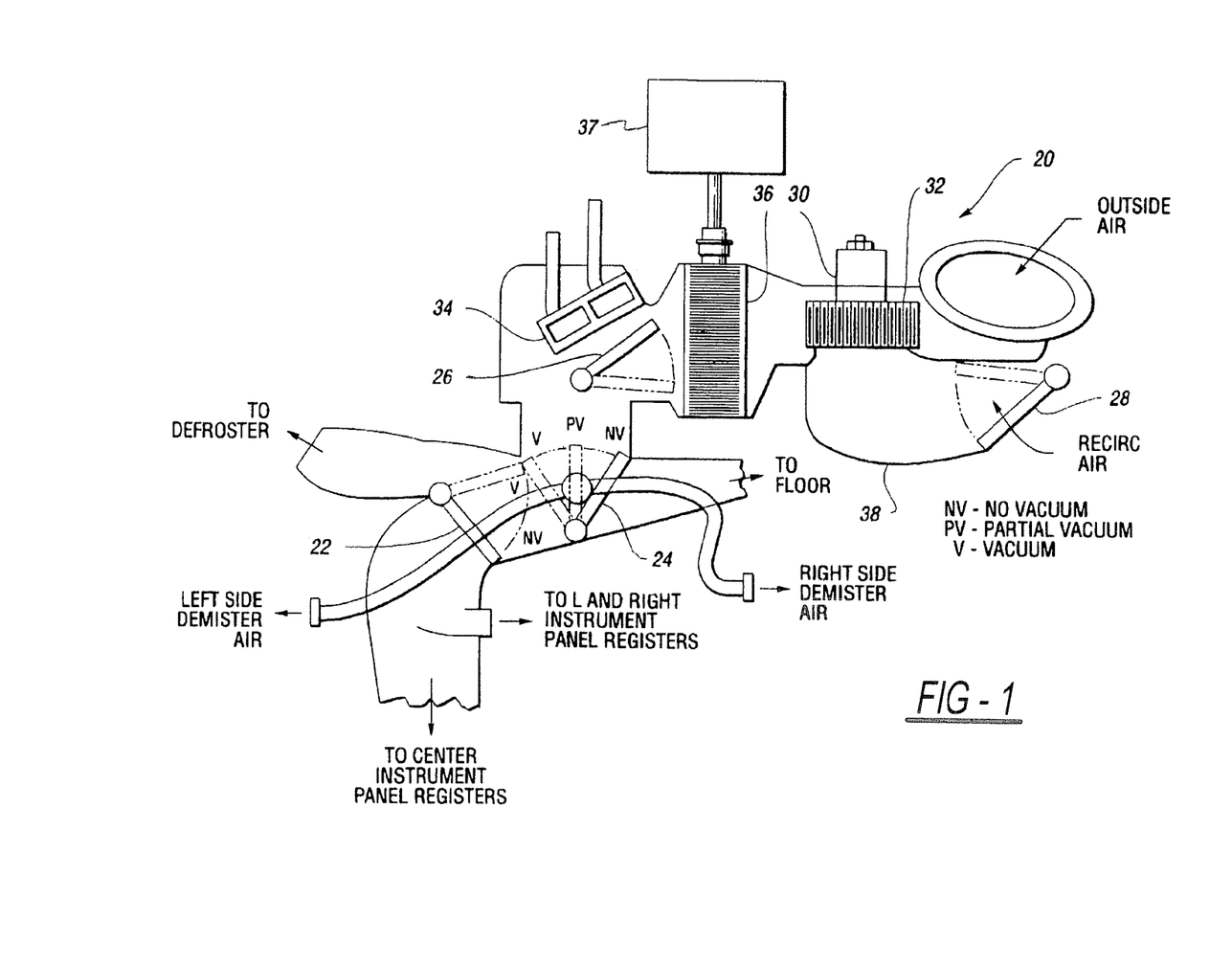
FIG. 1 is a schematic of an air handling system of a heating, ventilation, and air conditioning system of the disclosed invention.

In the following figures, the same reference numerals will be used to refer to the same components. In the following description, various operating parameters and components are described for different constructed embodiments. These specific parameters and components are included as examples and are not meant to be limiting. In general, control of air temperature and air flow (and to a lesser extent, humidity) within an automobile is achieved using various actuators to affect the temperature and flow of air supplied to the cabin of the vehicle. FIG. 1 shows schematically an air handling system of a heating, ventilation and air conditioning (HVAC) system, generally indicated as 20. The system 20 includes an arrangement of a panel-defrost door 22, a floor-panel door 24, a temperature blend door 26 and outside recirculation air door 28. It is to be understood that the door 28 functions to regulate air passage between fresh air and recirculated air. Any of a variety of air flow regulating devices may be used in addition to the illustrated door configuration.

The doors 22 and 24 are driven by any of several actuators (including, for example and without limitation, electric motors and vacuum controllers) in a conventional fashion as indicated in FIG. 1. The door 28 is typically driven by an electric servo motor so that the position of the door 28 is continuously variable. The system 20 also includes a variable speed motor 30 including a blower wheel 32.

The system further includes heating and cooling elements such as a heater core 34 and an evaporator core 36 in a typical vehicle air conditioning system 37 which includes all of the components of the known AC system. The evaporator temperature is normally controlled in a conventional automatic fashion to allow the system to dehumidify air passing thereover. The system 37 includes a compressor, a condenser, a refrigerant tank, a pressure cycling switch and an expansion device for metering refrigerant to the evaporator core 36. Each of the above components are connected via ducting 38. In this way, all of the above components control temperature, the direction of air flow and the ratio of fresh air to recirculated air.

Figure 2:
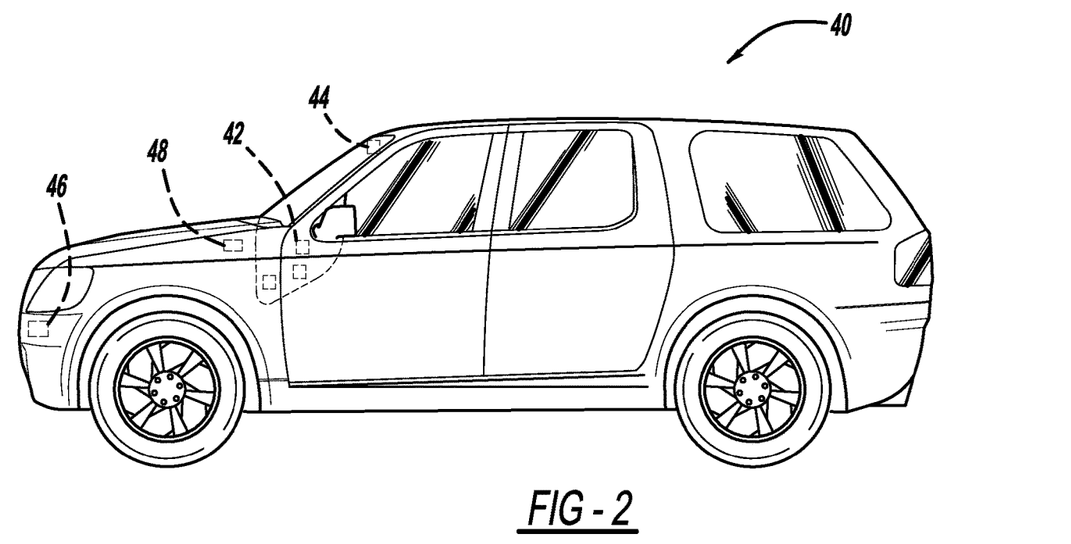
FIG. 2 is a side view of a vehicle including a portion of the instrument panel and certain sensors.
Figure 3:
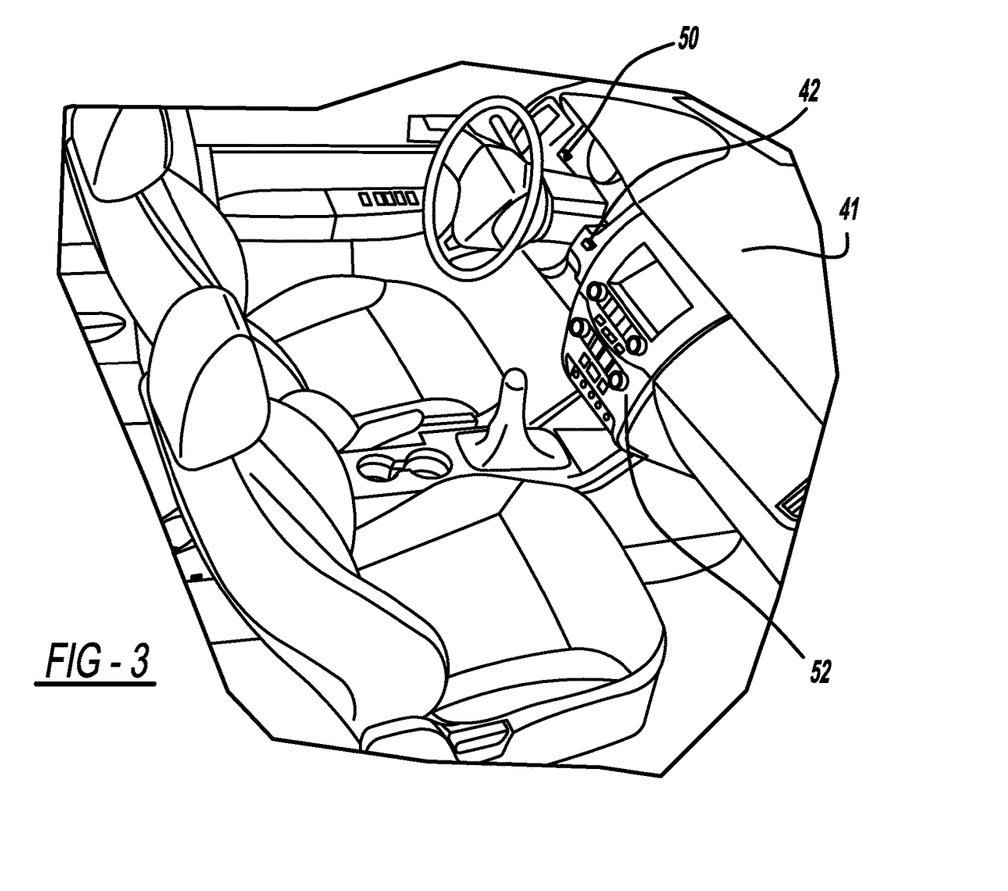
FIG. 3 is a view of a vehicle interior showing a portion of the instrument panel.

For automatic control of the temperature and flow of air in the cabin, conditions within and outside the cabin are monitored by sensors. An electronic controller generates signals to control the actuators according to the conditions as indicated by the sensors. These sensors are illustrated in FIG. 2 which is a side view of a vehicle, generally illustrated as 40 and in FIG. 3 which illustrates a portion of the interior of a vehicle and includes in particular an exemplary instrument panel 41. A typical complement of sensors of the HVAC system providing signals which are representative of an in-car temperature (Tincar) and humidity (or dewpoint) sensor 42 (typically located in the instrument panel but can be located elsewhere in the vehicle's interior; it is to be understood that temperature and humidity [or dewpoint] sensing may be done in a single sensor 42 or may be done by individual temperature and humidity sensors as is known in the art), a glass temperature sensor 44, an ambient (outside) air temperature (OAT or Tamb) sensor 46 (typically located in the front of the vehicle forward of the grill or elsewhere, such as associated with the vehicle's mirror, bumper or roof), engine coolant temperature (ECT) sensor 48 (typically located in the engine compartment), and sun-load sensor 50 (typically located in the instrument panel but can be located elsewhere in the vehicle's interior). In addition, there is a set signal or set temperature value (customer preferred temperature or Tset which is selected by the user via the control interface 52) indicating the desired temperature that is set manually by users.

The signals are provided to an electronic controller as inputs after being conditioned by a conditioning circuit. The controller scales the input signals and provides scaled output signals for use by a hardware controller which, in turn, controls the doors 22 through 28, the blower 32 and the control element to regulate the temperature and flow of air and ultimately to allow for more economic operation of the HVAC system.

While a single door 28 is illustrated, it is to be understood that a multiple door strategy may be used without deviating from the spirit and scope of the disclosed invention. The strategy for operating door 28 in a selective manner depending on climate load demand is generally set forth in the following table:

| Climate Load Demand | Al Door Position (100 - Full Recirc) |
|---|---|
| <80 | 100 |
| 81-151 | 0-100 |
| >152 | 100 |

In the above chart, low climate load demand represents a hot cabin with full sun in hot weather with full recirculation, high climate load demand represents a cold cabin in cold weather with full recirculation, and middle climate load demand represents a cool cabin in mild weather with fresh air. The position of the door is a function of climate load demand and includes such definable variables as Tincar, Tamb, Tset, and Sun Load. As set forth in the table above, "100" means "100% full recirculating position." At the upper portion of Table 1 the operating parameters are what happens in the event of a hot cabin in full sun in hot weather. At this stage it is desired to have 100% full air recirculation. Moving down the table above it is demonstrated how the door can be selectively moved to any point between 100% for full recirculation to 0% for full fresh air. For example, the door position can be adjusted from 75% to 50%, back to 75% and back again to 100%. In general then the middle or comfort ranges—those less than 100% full recirculation—represent mild weather and a comfortable cabin. In this situation the incoming air includes fresh air.

As the cabin and ambient weather become increasingly cold (toward the lower portion of the table above) the climate load demand increases and the air recirculation again is at 100%.

It is expected that the operating software would have hysteresis to prevent one or more of the doors from moving continuously while maintaining a transition condition.

The above-mentioned Tset is taken from the user input in the automatic temperature control. However, when a manual control head is provided in the vehicle another method of determining climate load demand is referenced. This is illustrated in the following table:

| 0% | Full Cold | Max Cooling |
|---|---|---|
| 20% | | |
| 40% | | |

-continued

| | | |
|---|---|---|
| 60% | | |
| 80% | | |
| 100% | Full Hot | Max Heating |

With reference to this table, in the manual temperature control the temperature door position (in percentage) is shown in relation to the "Full Cold" to "Full Hot" ranges with corresponding "Max Cooling" (with a climate load demand of 0) and "Max Heating" (with a climate load demand of 255).

Figure 4A:
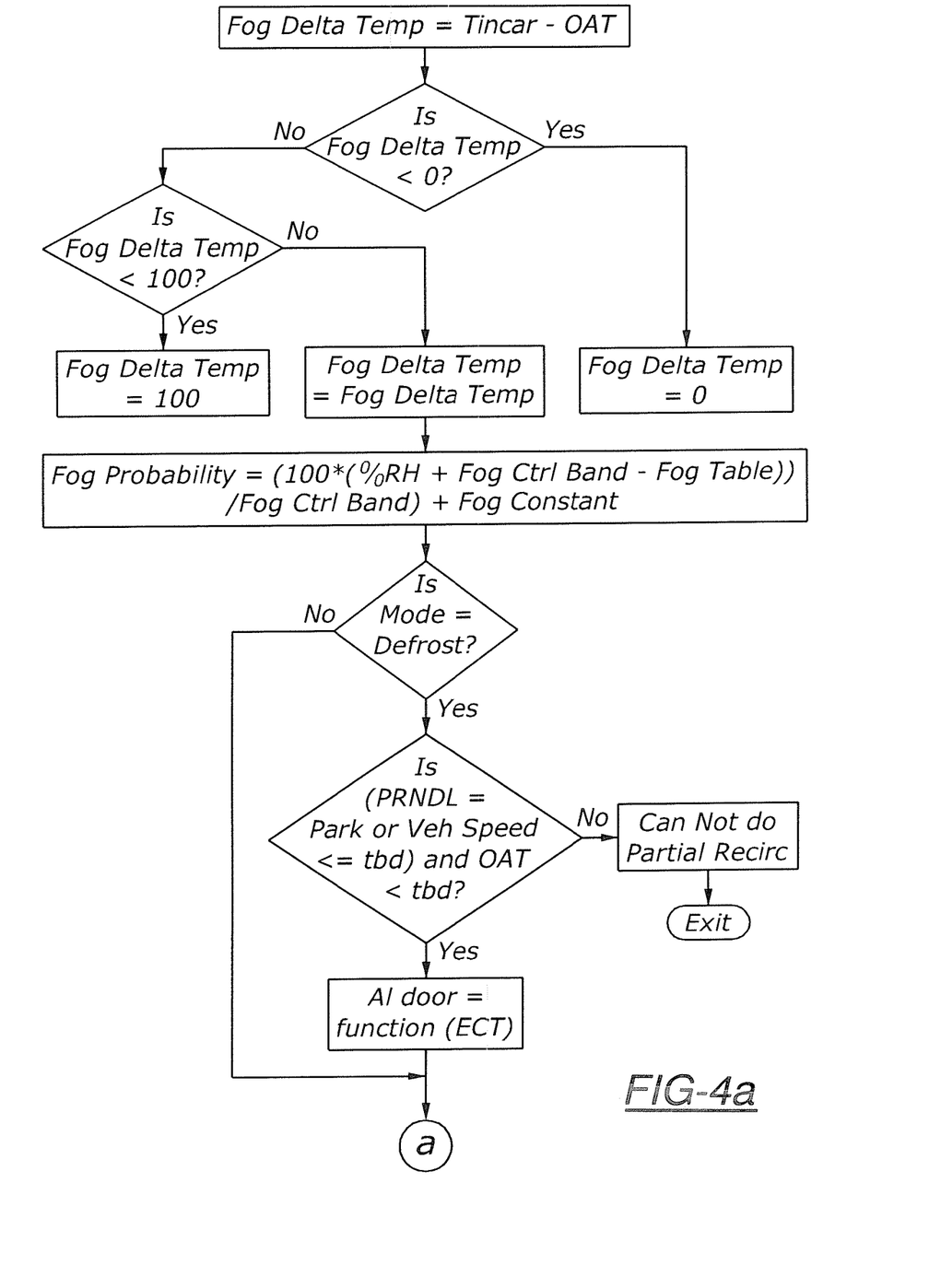
FIGS. 4a-4c when combined form a single flow chart illustrating a partial recirculation door override based on fogging probability.
Figure 4B:
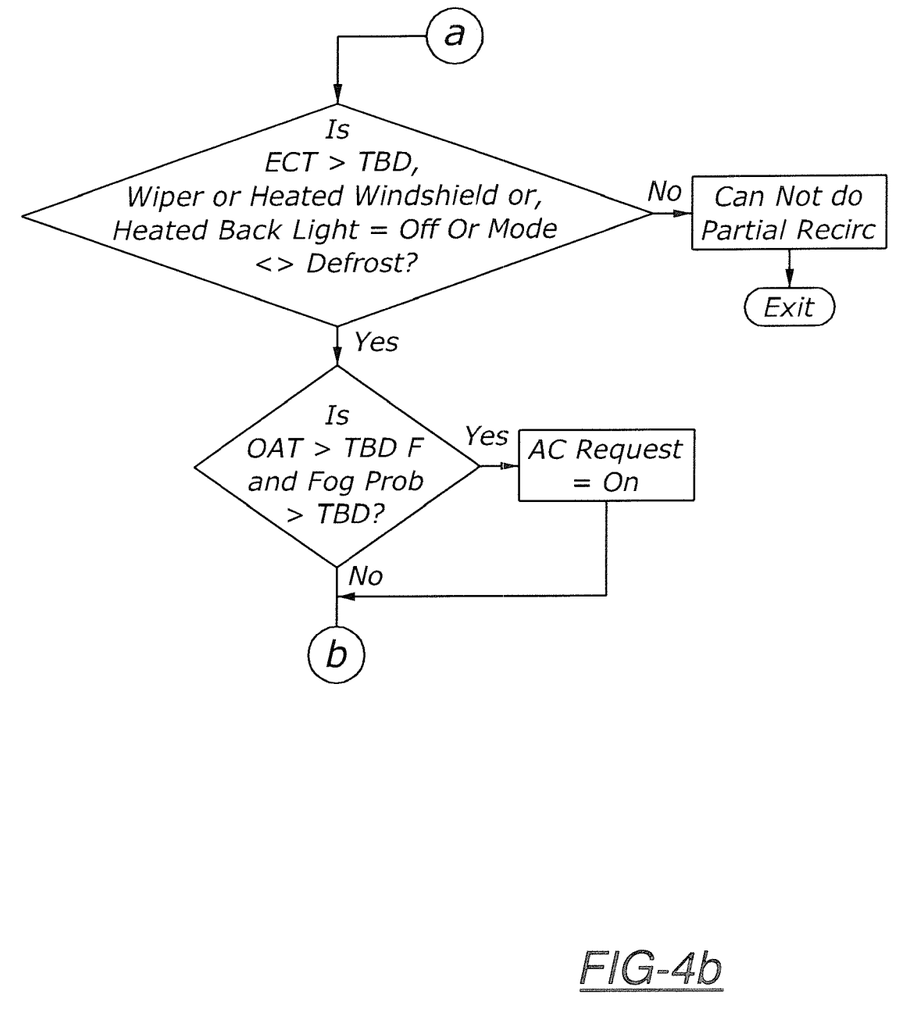
Figure 4C:
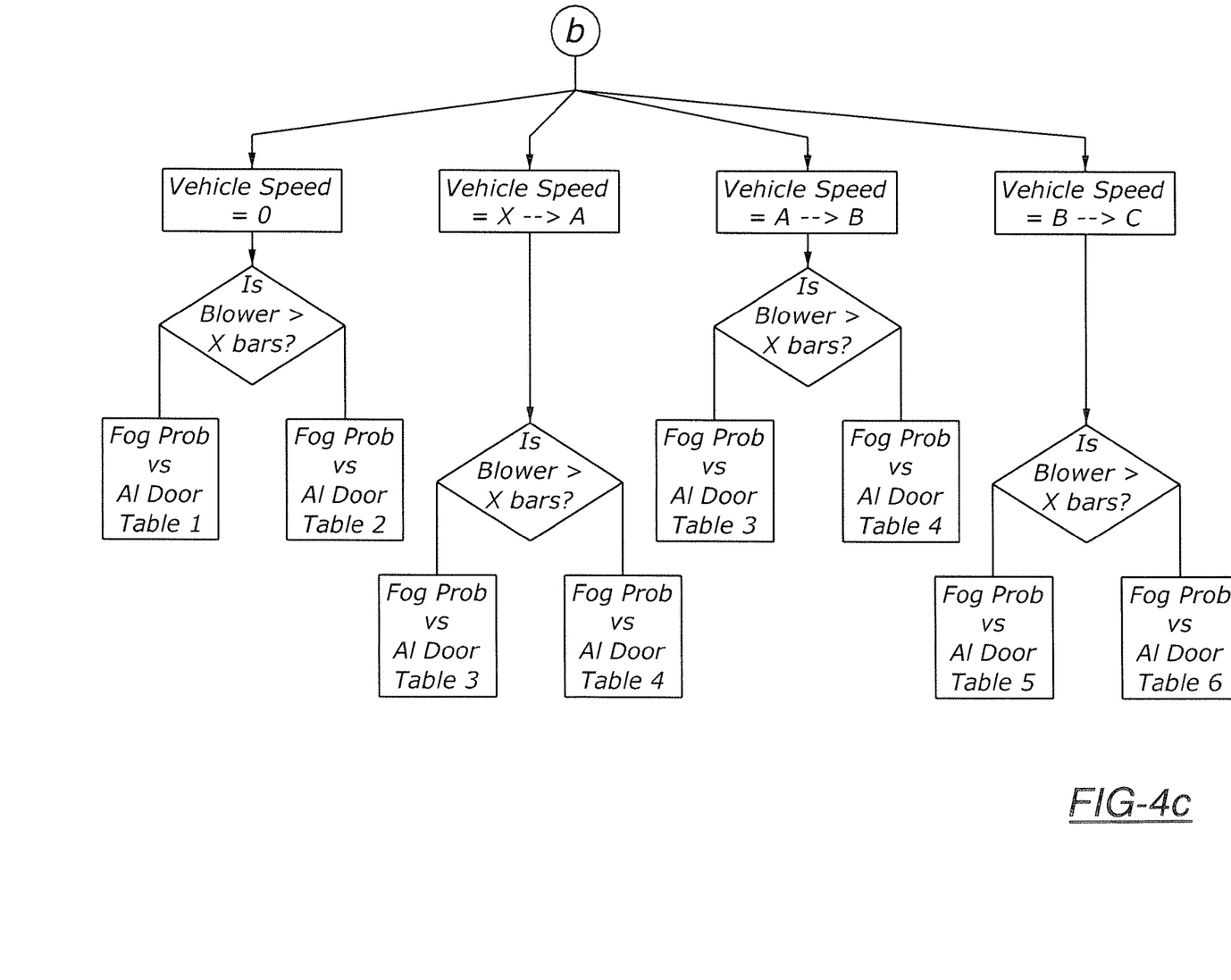

As set forth above, the selection between 100% recirculation and 100% fresh air must be made in consideration of the possibility of cabin fogging. The strategy of the disclosed invention provides an override based upon the probability of fogging. The parameters for the override are set forth in the flow chart of combined FIGS. 4a-4c. With reference to that flow chart, various parameters are received and assessed. For example and without limitation such parameters may include in-car temperature, humidity level or dew point, sunload, blower speed, air delivery mode (e.g., floor or panel mode), air intake door position, discharge air temperature, engine coolant temperature, the transmission gear selected, and vehicle speed.

The strategy of the disclosed invention takes into consideration certain vehicle dependent variables (represented in a Fog Table) which may be calibrated. These dependent variables together with the independent variables (Fog Delta Temp [° F.] [Tincar-OAT]) are set forth in the following table which is provided for non-limiting illustrative purposes only:

| Fog Delta Temp (° F.) (Tincar - OAT) | Fog Table |
|---|---|
| 0 | 100 |
| 20 | 66 |
| 40 | 47 |
| 60 | 30 |
| 80 | 15 |

Coupled with the cabin humidity values generated by the humidity sensor fogging probability calculations can be performed. Another method of determining cabin fogging risk can also be done by measuring the window/windshield glass and air dew point directly by known techniques.

A sample of fogging probability vs. door position may include the following:

| Fogging probability | Recirculation door position |
|---|---|
| 0-5 | 100% |
| 6-10 | 95% |
| 11-79 | 5% |
| 80-100 | 0% |

This chart is illustrative only and is intended to give an example of how data may be used to determine recirculation door position based on fogging probability.

It may be necessary to undertake one or more validation tests to determine the efficiencies of the disclosed invention. Specifically, an air leakage/infiltration test/NVH may be undertaken in which variables such as vehicle speed (such as 0-100 kph), blower speed (such as 1-7 bars), vent mode (such as panel or floor), the position of the recirculation door (such as 25%, 50%, 75%, and 100% with 100% being the full recirculation position), and the position of the blend door (such as 0%, 25%, 50%, 75%, and 100% with 100% being full heat) are evaluated.

A further test may be a fogging test to assess fogging potential in which variables such as the Tambient (such as 0-100° F.), the Tset (such as 72° F.), the vent mode (such as floor or auto), the blower position (such as auto), the portion of recirculation (such as fresh, ¼ fresh, ½ fresh, and ¾ fresh), amount of steam generated by a steam generator, and whether or not the AC is in the auto or off position are evaluated.

These are only some tests which may be undertaken. The validation tests set forth above are only exemplary and are not intended as being limiting.

The use of the present invention in climate control systems strategy results in optimum heating/cooling performance, fuel economy and/or high voltage (HV) battery power consumption. The ability to provide a system which selects any point between full recirculated air and full fresh air based upon operating efficiencies has not been undertaken in the past.

New vehicle programs and the requirements of simultaneous engineering are reducing the time available to develop new automatic climate control strategies. The organization and flexibility of the present invention allow one to develop a set of base rules even before the characteristics of a HVAC system have been finalized.

While the best mode for carrying out the invention has been described in detail, those familiar with the art to which this invention relates will recognize various alternative designs and embodiments for practicing the invention as defined by the following claims.

What is claimed is:

1. A system for economically controlling a heating, ventilation and air conditioning (HVAC) system for a vehicle having an interior and an exterior comprising:
    a fresh air opening;
    a recirculated air opening;
    a conditioner for heating or cooling air from said fresh air opening or recirculated air from said recirculated air opening;
    a movable air inlet mechanism operatively associated with at least one of said openings for closing said opening or causing said opening to be fully or partially opened;
    a temperature setting controller communicatively coupled to at least one of a solar radiation sensor, a humidity sensor, an outside ambient air temperature sensor, an interior temperature sensor, an in-car temperature sensor, a blower speed sensor, an air delivery mode sensor, an air intake flow regulator position sensor, a discharge air temperature sensor, an engine coolant temperature sensor, a gear selector sensor, a vehicle speed sensor, a wiper position sensor, a windshield temperature sensor, and a rear window temperature sensor; and
    a controller to which one of said sensors is connected and to which said air inlet mechanism is connected, said controller including an algorithm for first calculating climate load demand and second calculating fogging probability, said controller being programmed to cause said controller to selectively move said mechanism up to and including a position in which 100% of conditioned air in the vehicle is fresh air and up to and including a position in which 100% of conditioned air in the vehicle is recirculated air and to any position there between in response to a fogging probability determined from information signals from said at least one sensors, wherein the calculation for climate load demand is based upon information received from said temperature setting controller and said at least one sensor and the calculation for fogging probability is based upon said interior temperature sensor, said humidity sensor, and said outside ambient air temperature sensor.

2. The system of claim 1 wherein said one or more additional sensors includes said vehicle speed sensor and said blower speed sensor and wherein said controller is programmed to select the position of an air inlet door based on a combination of the speed of the vehicle, the blower speed, and the probability of fogging.

3. The system of claim 2 wherein said one or more additional sensors includes said vehicle speed sensor and wherein said controller is programmed to select the position of said air inlet door based on the speed of the vehicle and the probability of fogging.

4. The system of claim 2 wherein said one or more additional sensors includes said blower speed sensor and wherein said controller is programmed to select the position of said air inlet door based on the blower speed and the probability of fogging.

5. The system of claim 2 in which said controller is programmed to select the position of said air inlet door based on the probability of fogging alone.

6. A system for economically controlling a heating, ventilation and air conditioning (HVAC) system for a vehicle having an interior and an exterior comprising:
    a fresh air opening;
    a recirculated air opening;
    a conditioner for heating or cooling air from said fresh air opening or recirculated air from said recirculated air opening;
    a movable air inlet mechanism operatively associated with at least one of said openings for closing said opening or causing said opening to be fully or partially opened;
    a temperature setting controller;
    sensors for sensing solar radiation, humidity, outside ambient air temperature, and interior temperature;
    a controller to which said temperature setting controller and said sensors for sensing solar radiation, humidity, outside ambient air temperature, and interior temperature are connected and to which said air inlet mechanism is connected, said controller including an algorithm programmed to cause said controller to selectively move said mechanism to any position up to and including a position in which 100% of conditioned air in the vehicle is fresh air and up to and including a position in which 100% of conditioned air in the vehicle is recirculated air and to any position there between in response to information from the group consisting of data from a combination of one or more of said temperature setting controller and said sensors for sensing solar radiation, humidity, outside ambient air temperature, and interior temperature,
    wherein climate load demand is calculated based upon information received from said temperature setting controller and said sensors and fogging probability is calculated based upon said interior temperature sensor, said humidity sensor, and said outside ambient air temperature sensor, which is normalized on a scale from zero to one hundred, and wherein the controller positions the air inlet mechanism to about ninety-five percent or greater of the recirculated air opening when the fogging probability is between 6 and 10 and positions the air inlet mechanism to about five percent or less when the fogging probability is greater than 10 to optimize HVAC power performance, said mechanism being moved to 100% recirculation when said climate load demand is less than a first value, between 0%-100% recirculation when said demand is greater than said first value but less than a second value, and to back to 100% recirculation when said demand is greater than said second value.

7. The system of claim 6 including one or more additional sensors selected from the group consisting of an in-car temperature sensor, an air delivery mode sensor, an air intake flow regulator position sensor, a discharge air temperature sensor, an engine coolant temperature sensor, a gear selector sensor, a wiper position sensor, a windshield temperature sensor, and a rear window temperature sensor.

8. A method for economically controlling a heating, ventilation and air conditioning (HVAC) system of a vehicle which discharges a flow of air to a passenger cabin of the vehicle, the method comprising the steps of:
    forming an HVAC system comprising a recirculation door and associated ducts capable of being moved between a full fresh air position, a full recirculated air position, a partial re-circulated air position, a temperature setting controller, sensors for sensing solar radiation, humidity, outside ambient air temperature, an interior temperature sensor, and a controller including an algorithm;
    using said algorithm to first calculate climate load demand based upon information received from said temperature setting controller and said sensors;
    using said algorithm to second calculate fogging probability based upon information received from said interior temperature sensor, said humidity sensor, and said outside ambient air temperature sensor by executing a second algorithm; and
    adjusting the position of said recirculation door in response to both the calculated climate load demand and the calculated fogging probability to optimize HVAC power performance by positioning of the recirculation door.

9. The method of claim 8 including the step of minimizing or preventing air spillage due to the partial recirculation door position.

10. The method of claim 8 including the step of minimizing or preventing noise, vibration and harshness due to the partial recirculation door position.

11. The method of claim 8 including the step of minimizing or preventing air spillage as a function of vehicle speed.

12. The method of claim 8 including the step of minimizing or preventing noise, vibration and harshness as a function of vehicle speed.

13. The method of claim 8 including the step of inhibiting of partial recirculation control by any condition of the group consisting of defrost mode when the vehicle is not in the neutral or park position, engine coolant temperature upon reaching a specified value, and selection by the vehicle operator of any one of a heated windshield, a rear glass defroster, or a wiper after the engine is on for a predetermined time.

14. The method of claim 8 including the step of enabling the operation of the air conditioning system in the event of a high fogging risk.

15. The method of claim 8 including the step of forming a fogging probability lookup table.

16. The method of claim 15 wherein said calculation of fogging probability is based on the formula (100*(% RH+Fog Ctrl Band-Fog Lookup Table)/Fog Ctrl Band)+Fog Constant.

* * * * *